(12) United States Patent
Vey

(10) Patent No.: US 6,964,314 B1
(45) Date of Patent: Nov. 15, 2005

(54) THREE WHEEL MOTORCYCLE CONVERSION ASSEMBLY

(75) Inventor: Jeffrey L. Vey, Whitehouse, TX (US)

(73) Assignee: Motor Trike, Inc., Troup, TX (US)

( * ) Notice: Subject to any disclaimer, the term of this patent is extended or adjusted under 35 U.S.C. 154(b) by 199 days.

(21) Appl. No.: 10/231,709

(22) Filed: Aug. 30, 2002

(51) Int. Cl.$^7$ .......................... B62R 13/04; B62D 61/08
(52) U.S. Cl. ...................................... 180/209; 180/210
(58) Field of Search ................. 180/209, 210, 180/215, 219, 227, 211, 212, 214, 216, 217; 280/7.15, 282, 288, 284, 124.128

(56) References Cited

U.S. PATENT DOCUMENTS

| | | | | |
|---|---|---|---|---|
| 4,287,960 A | * | 9/1981 | McConnell ................... | 180/16 |
| 4,325,449 A | * | 4/1982 | D'Addio et al. ............ | 180/217 |
| 4,392,536 A | * | 7/1983 | Iwai et al. ................... | 180/217 |
| 4,463,964 A | * | 8/1984 | Takayanagi et al. ........ | 280/284 |
| 4,582,157 A | * | 4/1986 | Watanabe .................... | 180/215 |
| 4,673,053 A | * | 6/1987 | Tanaka et al. ............... | 180/227 |
| 5,499,689 A | | 3/1996 | Johnson ....................... | 180/16 |
| 5,692,577 A | * | 12/1997 | Dornbusch et al. ........... | 180/16 |
| 5,884,717 A | | 3/1999 | Lehman et al. ............. | 180/209 |
| 5,899,291 A | * | 5/1999 | Dumais ....................... | 180/209 |
| 6,378,644 B1 | | 4/2002 | Brown et al. ................ | 180/227 |
| 6,547,027 B1 | * | 4/2003 | Kalhok et al. ............... | 180/312 |

* cited by examiner

*Primary Examiner*—David R. Dunn
(74) *Attorney, Agent, or Firm*—Jones, Walker, Waechter, Poitevent, Carrere & Denegre, LLP

(57) ABSTRACT

A mounting assembly for converting a two wheel vehicle to a three wheel vehicle. The mounting assembly includes a swing arm assembly having two arms connected by an intermediate member with each of the arms having a pivotal connector attached to one of their ends. A third link has a first end pivotally connected to the intermediate member and a second end free of the swing arm assembly.

15 Claims, 4 Drawing Sheets

THREE WHEEL MOTORCYCLE CONVERSION ASSEMBLY

I. BACKGROUND OF INVENTION

The present invention generally relates to methods and devices for converting two wheel motorcycles into three wheel motorcycles and in particular relates to an assembly for attaching the frame of a motorcycle to a two wheel axle.

Three wheel motorcycles or tricycles are becoming increasingly popular and there are numerous methods of connecting the frame of a two wheel motorcycle to a two wheel axle assembly in order to construct the three wheel motorcycle. Two examples of these methods may be seen in U.S. Pat. Nos. 5,884,717 and 5,499,689. Devices such as in U.S. Pat. No. 5,884,717 fix the two wheel axle assembly to the motorcycle frame in a very rigid manner. When such a three wheel motorcycle makes a turn, there is no possibility of sideways movement of the rear axle relative to the frame. This arrangement results in a stiffer and less forgiving ride. U.S. Pat. No. 5,499,689 improves this situation by connecting the motorcycle frame to the axle assembly with joints which may pivot to some degree. While the device in U.S. Pat. No. 5,499,689 operates well with some motorcycles, it is not as satisfactory with other motorcycles, such as many Harley Davidson models, which tend to experience more vibration.

II. SUMMARY OF THE INVENTION

The present invention provides a mounting assembly for converting a two wheel vehicle to a three wheel vehicle. The mounting assembly comprises a swing arm assembly having two arms connected by an intermediate member with each of the arms having a pivotal connector attached to one of their ends. A third link has a first end pivotally connected to the intermediate member and a second end free of the swing arm assembly.

III. BRIEF DESCRIPTION OF THE DRAWINGS

IV. DETAILED DESCRIPTION

Figure 1:
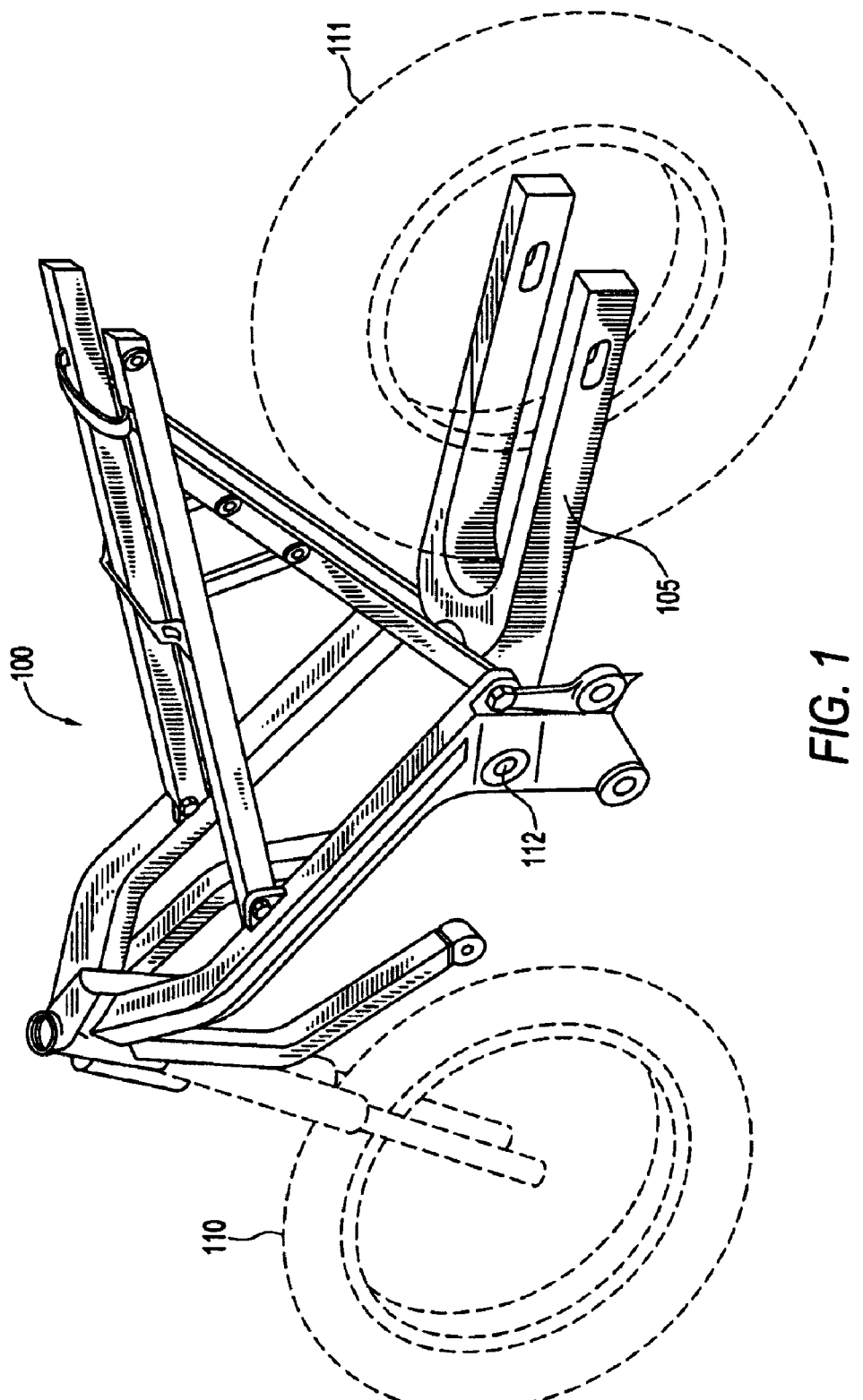
FIG. 1 is a perspective view of a prior art motorcycle frame and swing arm.

FIG. 1 illustrates a prior art motorcycle frame 100. Attached to the front of frame 100 will be a front wheel 110 and attached to the rear of frame 100 will be a swing arm 105 which supports rear wheel 111. Conventional swing arm 105 will be pivotally attached to frame 100 by frame pin 112 although in practice the suspension system (not shown) will keep swing arm 105 from pivoting freely. Typically, when conventional two wheel motorcycles are converted to three wheel motorcycles, it is the convention swing arm 105 which is removed and replaced with some type of swing armor ladder bar assembly which forms the connection between the conventional motorcycle frame 100 and the two wheel axle assembly.

Figure 2:
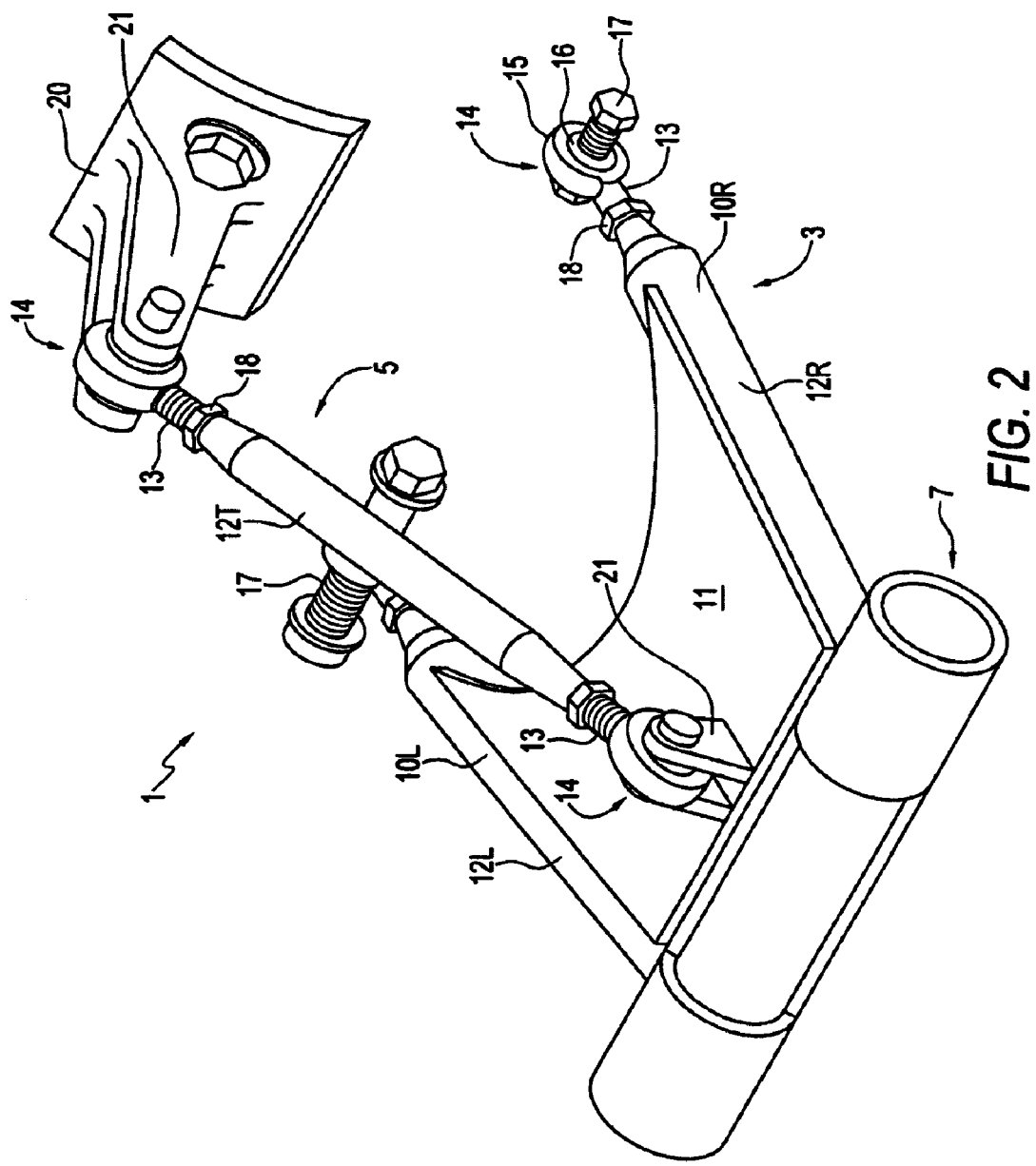
FIG. 2 is a perspective view of the mounting assembly of the present invention.

The present invention comprises a novel mounting assembly which provides a means for pivotally connecting the frame of a conventional motorcycle to a two wheel rear axle assembly, thereby transforming the conventional motorcycle into a three wheel motorcycle. FIG. 2 shows a perspective view of mounting assembly 1 and its two main components, swing arm 3 and third links. Swing arm 3 will include a pivoting frame connector 7 which is generally tubular and sized such that the frame pin 112 seen in FIG. 1 can engage frame connector 7 and pivotally secure swing arm 3 to frame 100 in the same manner as prior art swing arms. In particular, frame connector 7 is designed to accommodate the bushing system used with most Harley Davidson frame pins. Extending from frame connector 7 are right arm 10R and left arm 10L. Further, arms 10R and 10L will be rigidly attached to frame connector 7 by a conventional means such as welding. Arms 10R and 10L will generally comprise an outer tube 12R which attaches to frame connector 7 and an internal threaded shaft 13 which threadedly engages outer tube 12R such that threaded shaft 13 may extend out of and retract into outer tube 12R. The end of threaded shaft 13 extending from outer tube 12 will have a pivotal connector 14 positioned thereon. In the embodiment shown, pivotal connector 14 is a conventional "Heimjoint" which is formed of an eye ring 15 and a swivel ball 16 positioned within eye ring 15. When Heimjoint 14 is positioned (by rotating threaded shaft 13) the desired distance from the end of outer tube 12R, lock nut 18 will be rotated against the end of outer tube 12R and lock Heimjoint 14 in that position. While partially hidden from view in FIG. 2, it will be understood that the components of arm 10L are identical to those seen and described in 10R. Arms 10R and 10L will be joined by an intermediate member such as connector plate 11. Connector plate 11 will extend between and be firmly attached (such as by welding) to frame connector 7, arm 10L and arm 10R, thereby rigidly positioning these elements with respect to one another. However, the present invention is also intended to encompass intermediate members other than connector plate 11 which may not be rigidly attach to the arms 10R and 10L and/or frame connector 7.

The second major component of mounting assembly 1 is third link 5. Third link 5 is similar to arms 10L and 10R in that it comprises an outer tube 12 with threaded shafts 13 extending therefrom and pivotal connectors 14 on the end of threaded shafts 13. However, it can be seen that third link 5 is a turn buckle type of assembly which has a separate threaded shaft 13 on each end of outer tube 12T. It will be understood that rotation of the outer tube 12T in one direct will cause the pivotal connectors 14 to move away from one another while rotation of outer tube 12T in the opposite direction will cause connectors 14 to move toward one another. In other words, the effective length of third link 5 may be lengthened or shortened by rotation of outer tube 12T. As described above, lock nuts 18 will serve to lock the degree to which threaded shafts 13 extend from outer tube 12T. Third link 5 will be connected to swing arm 3 by away of a pair of ears 21 which are attached to connector plate 11. While removed from FIG. 2 for clarity, it will be understood that a pin or bolt such as the pin 17 on arm 10R's Heimjoint 14 will pivotally connect third link 5 to ears 21 and thus to connector plate 11. The end of third link 5 which is opposite connector plate 11 will likewise engage a pair of ears 21. However, this pair of ears 21 is connected to a mounting plate 20 which will be explained in more detail below.

Figure 3:
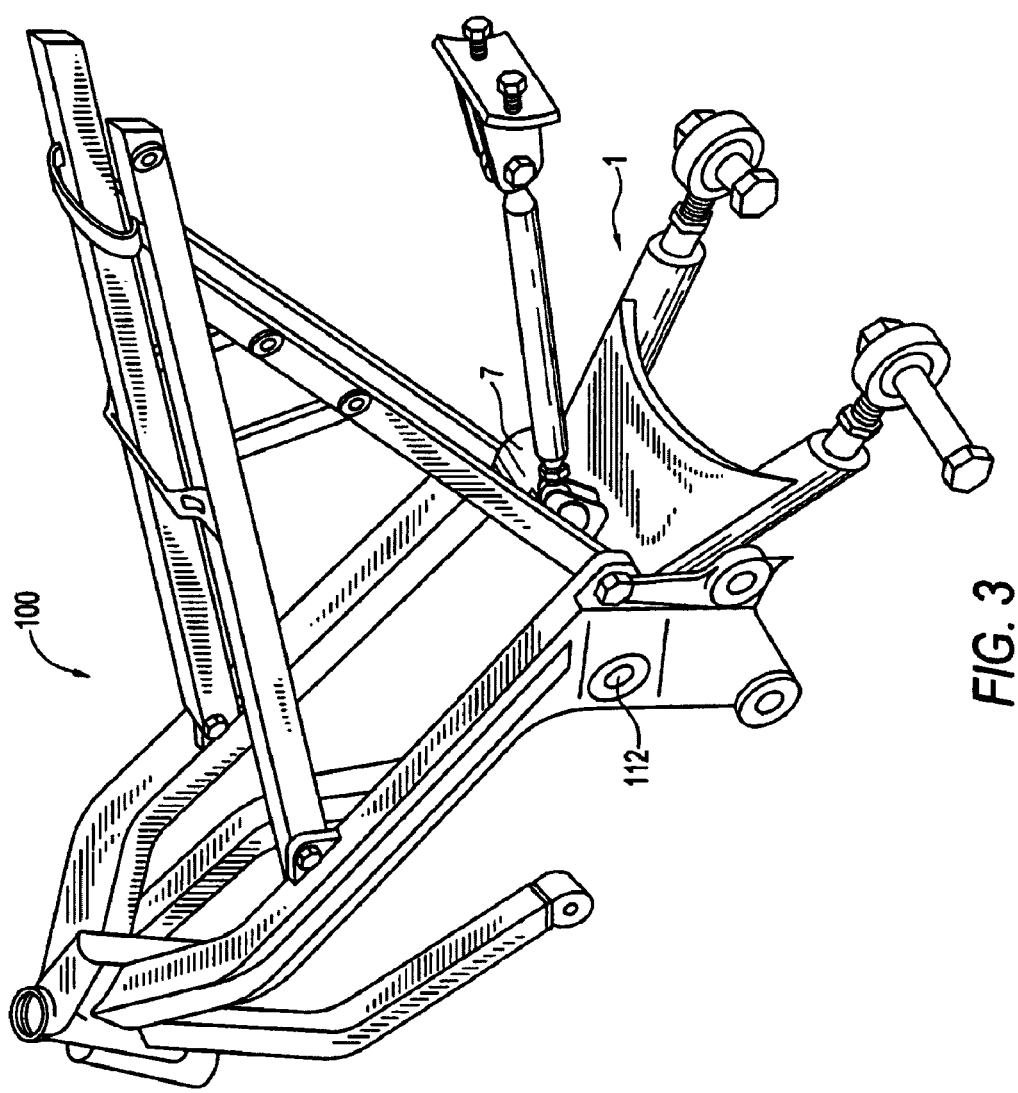
FIG. 3 is a perspective view of the mounting assembly connected to a motorcycle frame.

FIG. 3 illustrates how mounting assembly 1 will be connected to the frame 100 of a motorcycle. The existing frame pin 0.112 will engage frame connector 7 in the same manner that pin 112 engaged the prior art swing arm 105 seen in FIG. 1. As mentioned above, whatever type of bushing or bearing assembly supports the pivotal engagement of swing arm 105 by pin 112 will typically be utilized in the same manner in the connection between frame connector 7 and pin 112.

Figure 4:
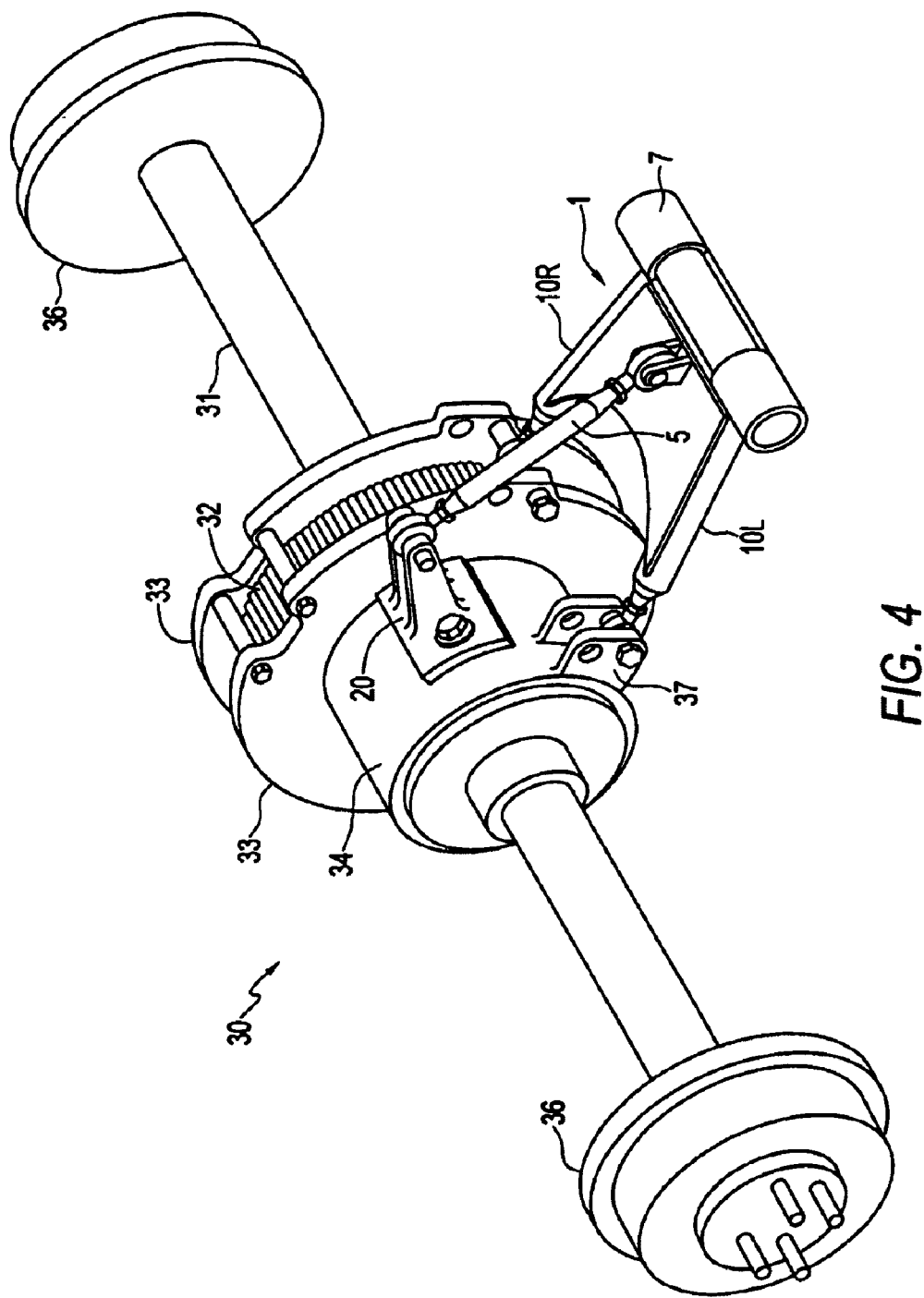
FIG. 4 is a perspective view of the mounting assembly connected to a two wheel rear axle assembly.

The manner of connecting the two wheel rear axle assembly 30 to mounting assembly 1 is shown in FIG. 4. Rear axle assembly 30 will generally comprise an axle 31, wheel hubs 36, and a drive gear housing 34. In the embodiment shown, rear axle assembly 30 is of the type which will be powered by a conventional motorcycle drive belt. Therefore, rear axle assembly 30 includes a belt gear 32 positioned between two belt gear side plates 33. Rear axle assembly 30 is known in the art and available from manufactures such as Motor Trike, Inc. located in Troup, Tex. and does not in and of itself form part of the present invention.

As clearly shown in FIG. 4, mounting plate 20 will be bolted to drive gear housing 34 while arm 10L is pinned to a pair of gear housing ears 37 and arm 10R is pinned to belt gear side plates 33. After arms 10R and 10L are pinned to rear axle assembly 30, threaded shafts 13 may be extended if necessary to provide a gross adjustment to drive belt tension. Additionally, threaded shafts 13 may be adjusted relative to one another to ensure that the rear wheels are properly aligned in the correct parallel orientation with the front wheel. Thereafter, third link 5 may be lengthened as need to provide a finer degree of tightening to the drive belt.

It will be really apparent how mounting assembly 1 provides a three point pivotal connection to rear axle assembly 30, with the arms 10R, 10L, and third link 5 each providing a means for pivotally and extendably attaching to rear axle assembly 30. It can be conceptualized how mounting frame 1 will function in a three wheel motorcycle. When both rear wheels are raised on a road surface, for example as in going over a speed bump, rear axle assembly 30 is allowed some degree of pivoting motion (of course limited by the suspension system) relative to frame 100 due to frame connector 7 being pinned to frame 100 at pin 112 (see FIG. 3). Nevertheless, the three point connection between mounting assembly 1 and rear axle assembly 30 prevents mounting assembly 1 from having any degree of rotation relative to rear axle assembly 30 around the axis of rear axle 31. On the other hand, when the three wheel motorcycle is subject to side load forces such as when traveling through a curve or turn, frame connector 7 cannot move relative to the frame in a sideways direction. However, because all three attachment points between mounting assembly 1 and rear axle assembly 30 are pivotal connections, there can be a slight sideways turning of rear axle assembly 30 relative to mounting assembly 1. Additionally, when one rear wheel is raised slightly by a small bump or irregularity in the roadway, the pivotal connections allow a slight rotation around the axis which is perpendicular to the axle 31 and parallel to the roadway surface. While this turning and rotation described above are small in magnitude, they have a significant effect on the feel of the ride. The pivotal connections give mounting assembly 1 the feel of an independent suspension system while providing the stability of a solid axle. Another significant advantage of the three point connection to the rear axle assembly 30 is the reduction of vibration.

While the present invention has been described in terms of specific embodiments, those skilled in the art will recognize many alternate embodiments intended to fall within the scope of the present invention. For example, while mounting assembly 1 is shown in the figures as being attached to belt driven rear axle assembly 30, those skilled in the art may well adapt mounting assembly 1 for use with existing shaft driven rear axle assemblies. Additionally, the depiction of a third link does not exclude the use of a fourth or even greater number of additional links. Nor is the pivoting frame connector 7 limited to tubular devices seen in the drawings, but could include a pair of mounting points such as disclosed in U.S. Pat. No. 5,499,689, which is incorporated by reference herein. These and all other such modifications are intended to fall within the scope and spirit of the following claims.

I claim:

1. A mounting assembly for converting a two wheel vehicle to a three wheel vehicle, the mounting assembly comprising:
   a. a swing arm assembly having two arms connected by an intermediate member, each of said arms having a pivotal connector attached to one end thereof; and
   b. a third link having a first end pivotally connected to said intermediate member and a second end free of said swing arm assembly having a pivotal connector attached to a mounting plate.

2. The mounting assembly according to claim 1, wherein said arms are extendable.

3. The mounting assembly according to claim 2, wherein said arms and said third link each further comprises an outer tube with a threaded shaft positioned therein.

4. The mounting assembly according to claim 1, wherein said pivotal connectors are Heim Joints.

5. The mounting assembly according to claim 1, wherein said intermediate member rigidly fixes said arms relative to one another.

6. The mounting assembly according to claim 1, wherein said intermediate member is a connector plate fixing a position of said arms relative to one another.

7. The mounting assembly according to claim 1, wherein said swing arm assembly includes a frame connector.

8. A three wheel motorcycle frame-axle assembly comprising:
   a. a motorcycle frame having a single front wheel;
   b. a two wheel axle assembly;
   c. a mounting assembly pivotally connected to said motorcycle frame, said mounting assembly comprising:
      i. two arms rigidly connected by an intermediate member, each of said arms attaching to said two wheel axle assembly; and
      ii. a third link having a first end pivotally connected to said intermediate member and a second end connected to said two wheel axle assembly, and
      iii. wherein said two arms and said third link each further comprise an outer tube with a threaded shaft positioned therein.

9. The frame-axle assembly according to claim 11, wherein said second end of said third link is pivotally connected to said two wheel axle assembly.

10. The frame-axle assembly according to claim 9, wherein said second end of said third link is connected to a mounting plate fixed to said two wheel axle assembly.

11. The frame-axle assembly according to claim 8 wherein said pivotal connections are made with Heim Joints.

12. The frame-axle assembly according to claim 10 wherein said pivotal connections are made with Heim Joints.

13. The frame-axle assembly according to claim 8, wherein said intermediate member is a plate fixing a position of said arms relative to one another.

14. The frame-axle assembly according to claim 8 wherein said mounting assembly has a generally tubular frame connector attached thereto.

15. The frame-axle assembly according to claim 11, wherein said mounting assembly includes a frame connector and said arms are pivotally connected to said two wheel axle assembly.

* * * * *